United States Patent
Ash et al.

(10) Patent No.: US 12,096,221 B2
(45) Date of Patent: Sep. 17, 2024

(54) DETERMINATION SYSTEM, DETERMINATION METHOD, AND COMPUTER-READABLE RECORDING MEDIUM

(71) Applicant: NIPPON TELEGRAPH AND TELEPHONE CORPORATION, Tokyo (JP)

(72) Inventors: David Ash, Kirkland, WA (US); Shmuel Ur, Shorashim (IL); Vlad Dabija, Mountain View, CA (US)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 409 days.

(21) Appl. No.: 17/370,354

(22) Filed: Jul. 8, 2021

(65) Prior Publication Data
US 2023/0008298 A1     Jan. 12, 2023

(51) Int. Cl.
    *H04W 12/104*    (2021.01)
    *H04W 12/63*    (2021.01)
    *H04W 24/10*    (2009.01)
    *H04W 64/00*    (2009.01)

(52) U.S. Cl.
    CPC ......... *H04W 12/104* (2021.01); *H04W 12/63* (2021.01); *H04W 24/10* (2013.01); *H04W 64/006* (2013.01)

(58) Field of Classification Search
CPC ... H04W 12/104; H04W 12/63; H04W 24/10; H04W 64/006
See application file for complete search history.

(56) References Cited

U.S. PATENT DOCUMENTS

| | | | |
|---|---|---|---|
| 5,757,916 A * | 5/1998 | MacDoran | G01S 19/215 380/258 |
| 8,321,913 B2 | 11/2012 | Turnbull et al. | |
| 9,014,666 B2 * | 4/2015 | Bentley | H04L 63/08 455/411 |
| 9,367,676 B2 | 6/2016 | Wilson | |
| 10,375,083 B2 * | 8/2019 | Arunkumar | H04W 12/08 |
| 10,673,864 B2 * | 6/2020 | Arunkumar | H04W 4/023 |
| 11,032,705 B2 * | 6/2021 | Manikantan Shila | H04W 12/08 |

(Continued)

OTHER PUBLICATIONS

InnovationQ+ (Year: 2023).*

(Continued)

*Primary Examiner* — Samson B Lemma
*Assistant Examiner* — Richard W Cruz-Franqui

(57) ABSTRACT

A determination system includes: a memory; and a processor coupled to the memory and programmed to execute a process comprising: acquiring location data representing a location of one or more user devices including a first sensor; searching for one or more public devices that is at a location corresponding to the location of the user device and that includes a second sensor having a same function as that of the first sensor included in the user device; requesting the user device to measure using the first sensor to acquire measurement data of the first sensor; acquiring measurement data of the second sensor included in the public device; and determining whether a user of the user device is legitimate based on a result of matching the measurement data of the first sensor with the measurement data of the second sensor.

7 Claims, 6 Drawing Sheets

(56) References Cited

U.S. PATENT DOCUMENTS

| | | | | |
|---|---|---|---|---|
| 2002/0104006 A1* | 8/2002 | Boate | ................... | H04W 12/08 |
| | | | | 713/186 |
| 2011/0109508 A1* | 5/2011 | Wolman | ............... | G01S 19/396 |
| | | | | 342/451 |
| 2011/0312301 A1* | 12/2011 | Muller | ................. | H04W 12/06 |
| | | | | 455/411 |
| 2013/0040603 A1* | 2/2013 | Stahlberg | ............... | H04L 63/14 |
| | | | | 455/410 |
| 2015/0215762 A1* | 7/2015 | Edge | ................... | H04W 8/005 |
| | | | | 370/338 |
| 2018/0212976 A1* | 7/2018 | Arunkumar | .......... | H04W 12/08 |
| 2019/0260759 A1* | 8/2019 | Arunkumar | .......... | H04W 4/023 |

OTHER PUBLICATIONS

NPL History Search (Year: 2023).*
NPL Search History (Year: 2024).*
Feng et al. (2012) "Location-Based Authentication and Authorization Using Smart Phones" 1285-1292. 10.1109/TrustCom.2012.198.

* cited by examiner

DETERMINATION SYSTEM, DETERMINATION METHOD, AND COMPUTER-READABLE RECORDING MEDIUM

BACKGROUND OF THE INVENTION

1. Field of the Invention

The present invention relates to a determination system, a determination method, and a computer-readable recording medium.

2. Description of the Related Art

An authentication of a user is required when the user logs into a network. When it is known that the user is frequently at home, that is, when the user is at one physical location, it is quite unlikely that the user is an attacker. Therefore, it is often extremely effective to check the physical location in the process of authenticating a user.

A physical location is sometimes checked using the Global Positioning System (GPS) coordinates that are acquired from a mobile device owned by the person. Because an IP address corresponds to, at least generally, a geographical location of the mobile device, there has also been a method for checking the physical location using an IP address.

However, because GPS coordinates or an IP address may be spoofed by an attacker, it cannot be said that these methods are foolproof. Related art examples are disclosed in U.S. Pat. No. 9,367,676B2, U.S. Pat. No. 8,321,913B2, and Zhang, Feng & Kondoro, Aron & Muftic, Sead. (2012). Location-Based Authentication and Authorization Using Smart Phones. 1285-1292. 10.1109/TrustCom.2012.198.

SUMMARY OF THE INVENTION

It is an object of the present invention to at least partially solve the problems in the conventional technology.

A determination system includes: a memory; and
a processor coupled to the memory and programmed to execute a process comprising: acquiring location data representing a location of one or more user devices including a first sensor; searching for one or more public devices that is at a location corresponding to the location of the user device and that includes a second sensor having a same function as that of the first sensor included in the user device; requesting the user device to measure using the first sensor to acquire measurement data of the first sensor; acquiring measurement data of the second sensor included in the public device; and determining whether a user of the user device is legitimate based on a result of matching the measurement data of the first sensor with the measurement data of the second sensor.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
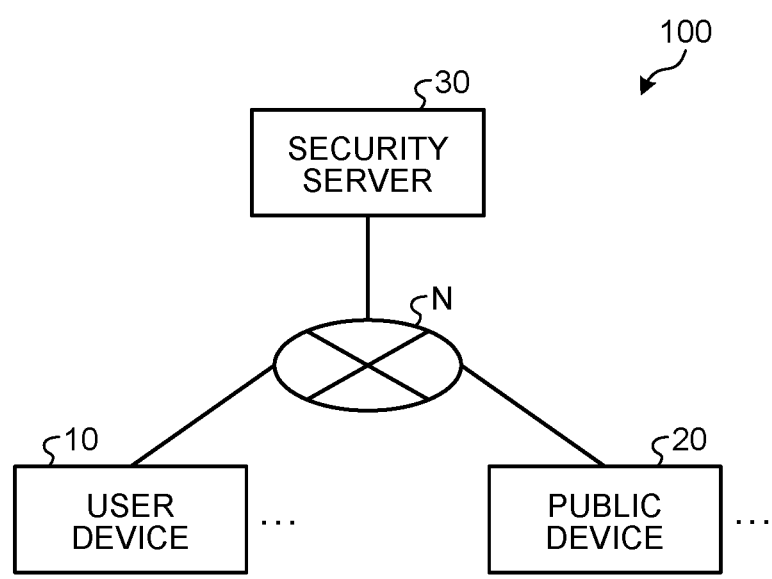
FIG. 1 is a schematic schematically illustrating one example of a determination system according to an embodiment.

An embodiment of the present invention will now be explained in detail with reference to some drawings. The embodiment is, however, not intended to limit the scope of the present invention in any way. Furthermore, in the depictions of the drawings, the same parts are indicated in a manner appended with the same reference numerals.

Embodiment

In this embodiment, a determination method for determining legitimacy of a user by authenticating the physical location of the user will now be explained.
Determination System FIG. 1 is a schematic schematically illustrating one example of the determination system according to the embodiment. As illustrated in FIG. 1, a determination system 100 includes a user device 10, a public device 20, and a security server 30.

The user device 10 and the security server 30 are connected to a network N over the wire or wirelessly. The user device 10 and the security server 30 are mutually communicable with each other over the network N. The public device 20 and the security server 30 are connected to the network N over the wire or wirelessly. The public device 20 and the security server 30 are mutually communicable with each other over the network N the network N.

Examples of the network N include a local area network (LAN), a wide area network (WAN), a telephony network (such as a mobile telephone network and a public switched telephone network), a regional Internet Protocol (IP) network, and the Internet. The configuration illustrated in FIG. 1 is merely one example, and the numbers of devices corresponding to the user device 10 and the public device 20 are not limited to a particular number.

The user device 10 is an information processing device used by a user, for example. The user device 10 may be implemented as a wearable terminal, a smartphone, a tablet terminal, a laptop personal computer (PC), a desktop PC, a mobile telephone, or a personal digital assistant (PDA), for example.

The user device 10 has a GPS function, and transmits GPS location information to the security server 30. The user device 10 has a sensor for measuring at least one of sound, temperature, pollution, smell, availability of a Wi-Fi network, and a characteristic of the network, for example. The user device 10 may also have a plurality of sensors. The user device 10 causes the sensor to make a measurement in response to a request from the security server 30, and transmits the measurement data to the security server 30.

The public device 20 is a device the installation position of which is known. The public device 20 includes a sensor having the same function as that of the user device 10. The public device 20 may also include a plurality of sensors. The public device 20 causes the sensor to make a measurement upon receiving a request from the security server 30 or on the regular basis, and transmits the measurement data to the security server 30.

The security server 30 determines whether the user of the user device 10 is legitimate based on the result of matching the measurement data from the sensor included in the user device 10 with the measurement data from the sensor included in the public device 20. The security server 30 retains sensor data of the user device 10 and the public device 20.

Overview of Process Performed by Determination System

Figure 2:
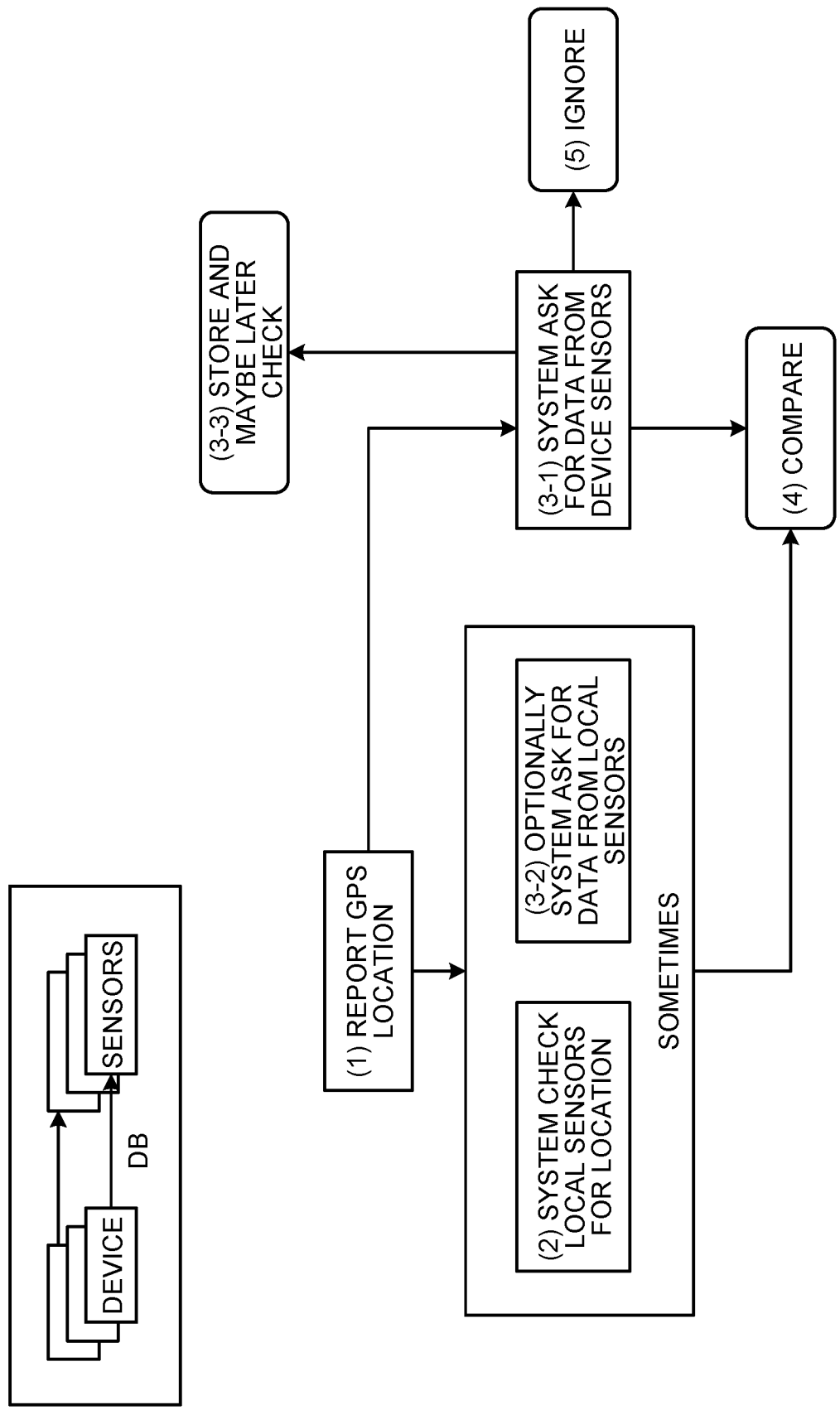
FIG. 2 is a schematic illustrating the sequence of a process performed in the determination system illustrated in FIG. 1.

FIG. 2 is a schematic illustrating the sequence of a process performed in the determination system 100 illustrated in FIG. 1. Because the user who is to be authenticated on a computer network is moving (or recognized to be moving) along a specific geographic route, the security server 30 collects the GPS metadata transmitted for the user device 10 in a series of time stamps ((1) "REPORT GPX LOCATION" in FIG. 2).

With respect to the same parameter, the security server 30 checks the route followed by the user, using sets of pieces of chronological measurement data from the sensor included in the user device 10 and pieces of chronological measurement data from the sensor included in the public device 20, where the sets are those collected from a matching time period. Because there is a database of user devices 10, the security server 30 knows what kind of sensor is provided to each of the devices that belong to a specific user.

The security server 30 then searches for a public device 20 within a predetermined area from the location of the user device 10, based on the GPS metadata transmitted from the user device 10 in the series of time stamps, based on the GPS location explicitly specified by the user, or based on a known GPS location ((2) "SYSTEM CHECK LOCAL SENSORS FOR LOCATION" in FIG. 2). This is performed to cause the public device 20 to make a measurement for the same parameter as that for which a measurement is made by the user device 10. In case of a smart city, there are a large number of public devices 20 that are installed at known locations. For example, among these public devices 20, the security server 30 searches for a public device 20 that is in direction in which a measurement is made by the user device 10.

The security server 30 then requests the user device 10 to measure the parameter value ((3-1) "SYSTEM ASK FOR DATA FROM DEVICE SENSORS" in FIG. 2). The user device 10 needs to respond considerably quickly. This is for preventing attackers from searching for the same kind of sensors within the area, and making queries. Examples of the parameter for which a query is made include sound, temperature, atmospheric pressure, pollution, availability of a Wi-Fi network, a characteristic of the network, and the like, and any combination thereof, but the parameter is not limited to these examples.

The security server 30 also transmits random requests to the user device 10 as appropriate, thereby demanding quick responses, and stores therein the information. The security server 30 optionally requests the public device 20, that is, the public device 20 near the user device 10 to transmit measurement data ((3-2) in FIG. 2).

The same parameter value is queried from the public device 20 near the user device 10, the public device 20 having been discovered by the security server 30. As another option, for a frequently used location, the security server 30 monitors the public device 20 in the frequently used location over time. In this manner, the security server 30 stores therein chronological sensor measurement data for later comparisons ((3-3) in FIG. 2). As another option, the security server 30 is trained with specific environment signatures (such as characterizing smell, pollution, or background noise) (an average and a normal range) of the location in different time periods of a day.

The security server 30 compares the history of the measurement data from the user device 10 with that of the measurement data from the discovered public device 20 ((4) in FIG. 2). The measurement data from the public device 20 is one of chronological measurement data measured by the public device 20, and the location signatures with which the security server 30 is trained, as the measurement data from the public device 20.

If the history of the measurement data from the user device 10 and the history of the measurement data from the discovered public device 20 match, the security server 30 determines that the user is legitimate. If the history of measurement data from the user device 10 and the history of the measurement data from the discovered public device 20 do not match, the security server 30 determines that the user of the user device is illegitimate ((5) "IGNORE" in FIG. 2).

In the manner described above, the security server 30 authenticates a user location and a user trajectory highly reliably.

The method for collecting the parameter data differs depending on the type of the parameter. For example, when the parameter is sound, a microphone installed in a telephone that is the user device 10 is used. Depending on situations, the user is instructed to hold his/her telephone in a specific direction, and to acquire data sent from the direction.

When the parameter is pollution, temperature, or smell, the user device 10 needs to be provided with a sensor capable of measuring the pollution, the temperature, or the smell. The chronological measurement data acquired from the sensor included in the user device 10 is then uploaded to the security server 30.

The security server 30 matches the measurement data from the user device 10 with the measurement data from the public device 20. The public device 20 is a public device 20 at a known location within a predetermined area from the location of the user device 10. The measurement data from the public device 20 is chronological measurement data having the time stamps corresponding to those of the measurement data from the user device 10.

As a result, if the measurement data from the user device 10 and the measurement data from the public device 20 match, the security server 30 determines that it is highly likely that the user trajectory is included in all of the positions within the physical location explicitly specified by the user.

If the measurement data from the user device 10 and the measurement data from the public device 20 do not match, the security server 30 determines that it is necessary to carry out further investigations because there is a possibility that the user to be authenticated is actually an attacker.

These pieces of sensor measurement data themselves are not extremely accurate, but the accuracy of the location identification is improved more by using a larger numbers of the parameters and the sensors simultaneously.

User Device

Figure 3:
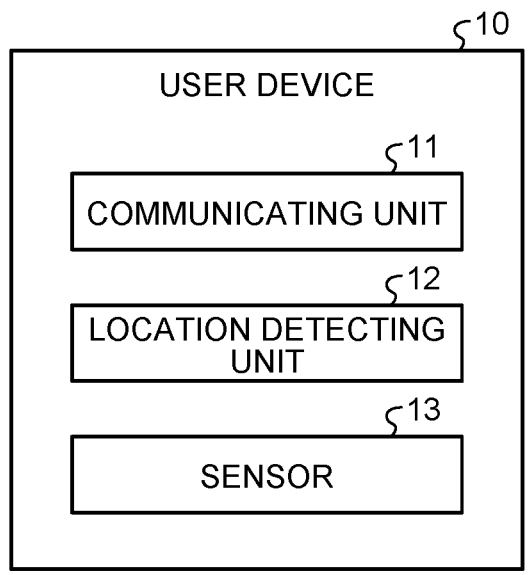
FIG. 3 is a schematic schematically illustrating one example of a configuration of the user device illustrated in FIG. 1.

FIG. 3 is a schematic schematically illustrating one example of a configuration of the user device 10 illustrated in FIG. 1.

The user device 10 is implemented by causing a predetermined computer program to be read onto a computer or the like including a read-only memory (ROM), a random access memory (RAM), and a central processing unit (CPU), and causing the CPU to execute the predetermined computer program. The user device 10 also includes a communication interface for transmitting and receiving various types of information to and from another device connected over a network, for example.

The user device 10 includes a communicating unit 11, a location detecting unit 12, and a sensor 13 (first sensor).

The communicating unit 11 includes a network interface card (NIC) or the like, and communicates with another device over an electric communication circuit such as a local area network (LAN) or the Internet.

The location detecting unit 12 has a GPS function, and detects location information of the user device 10 via the communicating unit 11. The location detecting unit 12 transmits the detected location information of the user device 10 to the security server 30 via the communicating unit 11.

The sensor 13 measures at least one of sound, temperature, pollution, smell, availability of a Wi-Fi network, and a characteristic of the network, for example. The sensor 13 may be provided in plurality, without limitation to one. When the plurality of sensors 13 present, measurement data of different types of sensors are detected. The sensor 13 performs a measuring process in response to a measurement request made by the security server 30. The measurement data of the sensor 13 is transmitted to the security server 30 via the communicating unit 11.

Public Device

Figure 4:
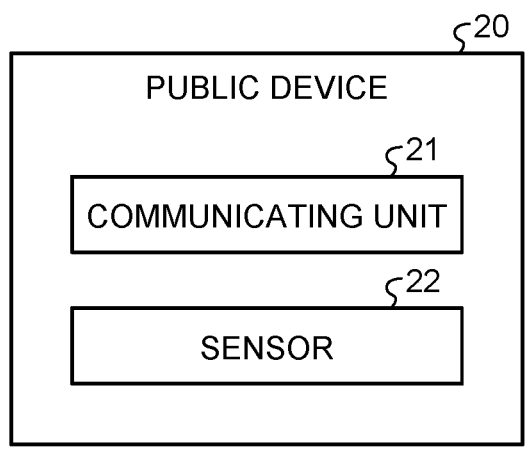
FIG. 4 is a schematic schematically illustrating one example of a configuration of the public device illustrated in FIG. 1.

FIG. 4 is a schematic schematically illustrating one example of a configuration of the public device 20 illustrated in FIG. 1.

The public device 20 is implemented by causing a predetermined computer program to be read onto a computer or the like including a ROM, a RAM, and a CPU, and causing the CPU to execute the predetermined computer program. The public device 20 also includes a communication interface for transmitting and receiving various types of information to and from another device connected over a network, for example.

The public device 20 includes a communicating unit 21 and a sensor 22 (second sensor).

The communicating unit 21 includes a network interface card (NIC) or the like, and communicates with another device over an electric communication circuit such as a local area network (LAN) or the Internet.

The sensor 22 is a sensor having the same function as that of the sensor 13 provided to the user device 10. The sensor 22 measures at least one of sound, temperature, pollution, smell, availability of a Wi-Fi network, and a characteristic of the network, for example. The sensor 22 may be provided in plurality, without limitation to one. When the plurality of sensors 22 present, measurement data of different types of sensors are detected.

The location of the public device 20 is known, and the location data of the public device 20 as well as the sensor data related to the sensor included in the public device 20 are retained by the security server 30.

Security Server

Figure 5:
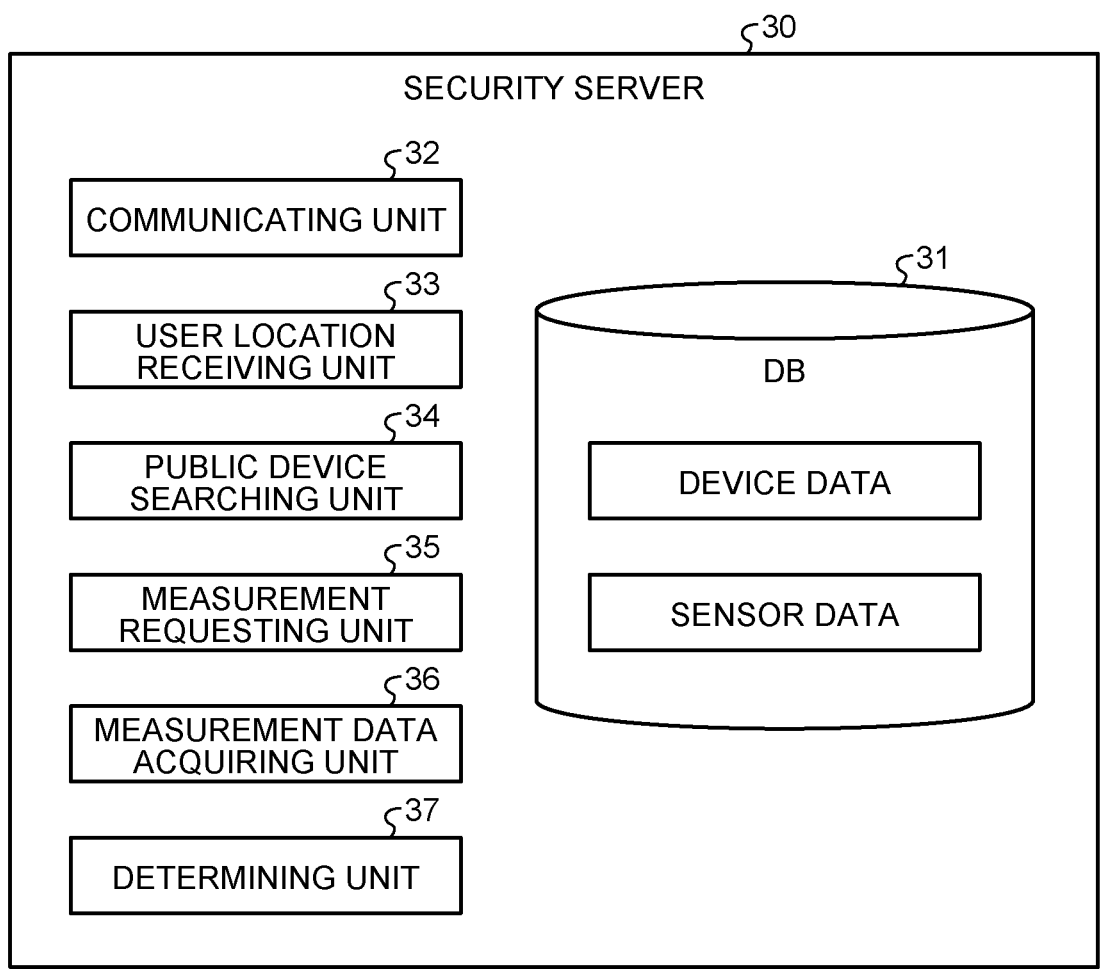
FIG. 5 is a schematic schematically illustrating one example of a configuration of the security server illustrated in FIG. 1.

FIG. 5 is a schematic schematically illustrating one example of a configuration of the security server 30 illustrated in FIG. 1.

The security server 30 is implemented by causing a predetermined computer program to be read onto a computer or the like including a ROM, a RAM, and a CPU, and causing the CPU to execute the predetermined computer program. The security server 30 also includes a communication interface for transmitting and receiving various types of information to and from another device connected over a network, for example.

The security server 30 includes a databases (DB) 31, a communicating unit 32, a user location receiving unit 33, a public device searching unit 34, a measurement requesting unit 35, a measurement data acquiring unit 36, and a determining unit 37.

The DB 31 stores therein identification data of the user device 10 and the type of the sensor included in the user device 10 in a manner mapped to each other. The DB 31 stores therein identification data and location data of the public device 20, and the type of the sensor included in the public device 20 in a manner mapped to one another. The DB 31 stores there in a history of chronological measurement data from the public device 20.

The communicating unit 32 includes a network interface card (NIC) or the like, and communicates with another device over an electric communication circuit such as a local area network (LAN) or the Internet.

The user location receiving unit 33 acquires location data representing the location of the user device 10. The user location receiving unit 33 receives GPS coordinates of the user device 10, with a time stamp appended thereto. When the user is moving, the GPS function of the user device 10 reports the locations of the user device 10 to the user location receiving unit 33.

The public device searching unit 34 searches for a public device 20 that is at a location corresponding to the location of the user device 10 and that includes a sensor having the same function as that of the sensor 13 in the user device 10.

The measurement requesting unit 35 requests the user device 10 to measure using the sensor 13.

The measurement data acquiring unit 36 acquires the measurement data from the sensor 13. The measurement data acquiring unit 26 acquires the measurement data of the sensor 22 provided to the public device 20 having been discovered by the public device searching unit 34, the measurement data being that belonging to the same time period as that of the measurement data from the sensor 13. For a frequently used location, the measurement data acquiring unit 36 may monitor the public device 20 over time, and store chronological measurement data of the sensor 22 for later comparisons. As another option, the measurement data acquiring unit 36 may be trained with specific environment signatures (such as characterizing smell, pollution, or background noise) (an average and a normal range) of the frequently used location in different time periods of a day in advance, and to predict the measurement data of the sensor 22 in the same time period as that of the measurement data of the sensor 13, based on the training result.

The determining unit 37 determines whether the user of the user device 10 is legitimate based on the result of matching the measurement data of the sensor 13 with the measurement data of the sensor 22. If the measurement data of the sensor 13 and the measurement data of the sensor 22 match, the determining unit 37 determines that the user of the user device 10 is legitimate. If the measurement data of the sensor 13 and the measurement data of the sensor 22 do not match, the determining unit 37 determines that the user of the user device 10 is illegitimate. In other words, the determining unit 37 determines that there is a possibility that user of the user device 10 is a spoofer or an attacker. If there is more than one sensor 13 and more than one sensor 22, the determining unit 37 may check the measurement data of a plurality of sensors 13 against the measurement data of a plurality of sensors 22, and if no match is found therebetween, determine the user as an unauthorized user.

In order to check the chronological locations of the user device 10, being reported over a certain time period, the security server 30 requests the user device 10 to transmit a series of pieces of measurement data of the sensor 13 at irregular timing. The user device 10 is not informed of what kind of measurement data is requested at which timing in advance. The user device 10 needs to respond quickly to such a query (e.g., within one second). For example, the system of the security server 30 performs a first method, a second method, or a third method described below.

The first method will now be explained. Before requesting the transmission of the measurement data of the sensor 13, the security server 30 checks a "public" local sensor/actuator (the public device 20) that is accessible within the area where the sensor 13 is located. The security server 30 then requests the public local sensor/actuator to transmit parameter measurement data. As another option, when the public local sensor/actuator is a router or a speaker, the security server 30 requests the router or the speaker to broadcast something. At the same time, the security server 30 requests the public device 20 to transmit the measurement data using an appropriate sensor. The security server 30 requests the user device 10 to transmit the measurement data of the sensor 13.

The security server 30 compares two data sets (a data set from the user device 10 and another from the public device 20).

In this first method, if the user device 10 is not actually in the explicitly specified location, it is not possible to make a comparison. In the first method, if the user of the user device 10 is a spoofer, in order to make a correct response to a request of the security server 30, the spoofer needs prepare a correct parameter response to the query. However, there are too many possible queries for which responses need to be prepared. Furthermore, if the user of the user device 10 is a spoofer, it is impossible for the spoofer to request all of the public devices 20 located at the correct locations to transmit the information every time the information is requested from the security server 30. Therefore, in the first method, it is possible to confirm the location of the user of the user device 10 reliably. This first method imposes a relatively small overhead on the legitimate user device 10 and security server 30, but requests a malicious user to take a huge overhead or impossible overhead.

As the second method, the security server 30 often only requests information, and does not do anything about the request. This method imposes a small load on the communication of the security server 30 or on the legitimate user device 10, but this method imposes extremely large load on an attacker who needs to keep remotely querying all of the public devices 20 in the explicitly specified locations so as to acquire correct measurement data.

As the third method, there is a method for causing the security server 30 to request the public device 20 to transmit the measurement data of the sensor 22, and to store the measurement data for later comparisons.

It is difficult for a spoofer to break this solution. This is because the security server 30 can make many requests, a spoofer device needs to respond to such requests quite quickly, and therefore the spoofer needs to query many public devices 20 in advance. These attempts require quite a lot of efforts, and therefore, some kind of trace is left behind. With this, the management system of the public device 20 can report that a certain device is making more queries than those made by any other ordinary users. Unless the spoofing device always has all of the correct parameter measurement data, the security server 30 checks the spoofing device many times over time, so that it is highly likely for the security server 30 to catch the spoofing device. The spoofing device is incapable of waiting for a query before checking the sensor so as not to generally respond quickly. Therefore, when the user device 10 is a spoofing device, the time by which the security server 30 receives the response becomes extended.

Sequence of Processing Method

Figure 6:
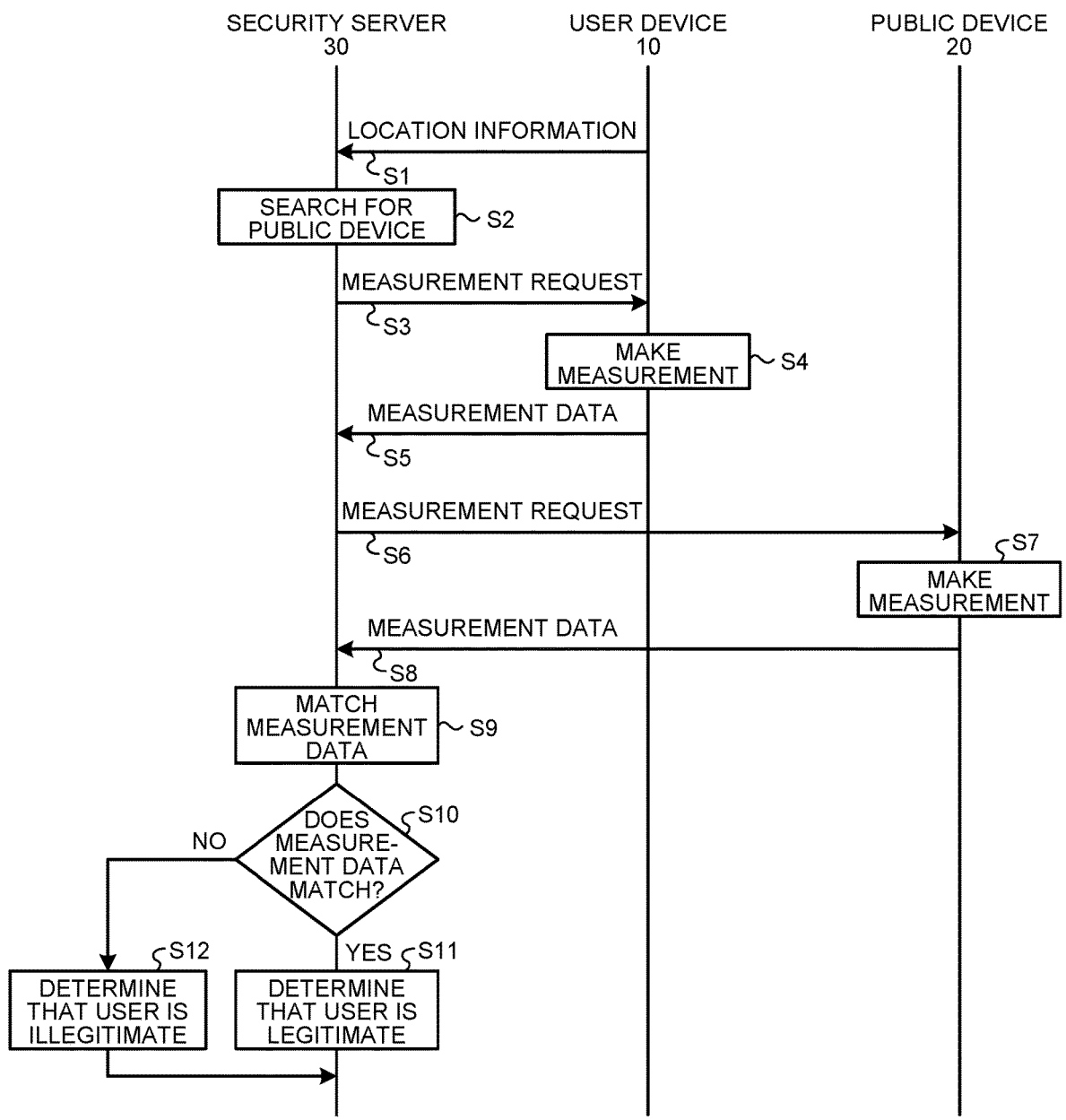
FIG. 6 is a sequence chart illustrating a processing procedure of a process performed by the determination system illustrated in FIG. 1.

FIG. 6 is a sequence chart illustrating a processing procedure of a process performed by the determination system 100 illustrated in FIG. 1.

When the location information is acquired from the user device 10 (Step S1), the security server 30 searches for a public device 20 that is at the location corresponding to the location of the user device 10 and that includes a sensor 22 with the same function as that of the sensor 13 provided to the user device 10 (Step S2).

The security server 30 requests the user device 10 to measure using the sensor 13 (Step S3), and causes the sensor 13 of the user device 10 to make a measurement (Step S4). By causing the user device 10 to transmit the measurement data of the sensor 13 (Step S5), the security server 30 acquires the measurement data of the sensor 13 from the user device 10.

The security server 30 requests the public device 20 discovered at Step S2 to measure using a sensor (Step S6), and causes the sensor 22 of the public device 20 to make a measurement (Step S7). By causing the public device 20 to transmit the measurement data of the sensor 22 (Step S8), the security server 30 acquires the measurement data of the sensor 22 from the public device 20. As another option, the security server 30 may also acquire the measurement data to be matched, from the pieces of measurement data measured in advance by the sensor 22, and retained by the security server 30. The security server 30 may also be trained with the measurement data of the sensor 22 in advance, and to predict the measurement data of the sensor 22 based on the training result.

The security server 30 then matches the measurement data of the sensor 13 with the measurement data of the sensor 22 (Step S9). If the measurement data of the sensor 13 and the measurement data of the sensor 22 match (Yes at Step S10), the security server 30 determines that the user of the user device 10 is legitimate (Step S11). If the measurement data of the sensor 13 and the measurement data of the sensor 22 do not match (No at Step S10), the security server 30 determines that the user of the user device 10 is illegitimate (Step S12).

In the manner described above, in the embodiment, by matching the difficult-to-be-spoofed measurement data of the sensor 13 of the user device 10 with measurement data of the sensor 22 of the public device 20 that is at a location corresponding to the location of the user device 10 and the location of which is known, the measurement data being difficult to be spoofed by an attacker, it is possible to authenticate the physical location of the user correctly.

In particular, the embodiment is effective in authenticating the physical location of the user who is moving with a mobile device, over time.

System Configurations

The illustrated components of the devices are functionally conceptual, and need not be physically configured as illustrated. In other words, the specific modes of distribution and integration of the devices are not limited to those illustrated in the drawings, and all or a part thereof can be functionally or physically distributed or integrated in any desired units according to various kinds of load and conditions of use. All or a certain part of the processing functions performed by the devices may be implemented by a CPU and a computer program analyzed and executed by the CPU or may be implemented as hardware using wired logic.

All the automatic processes explained in the present embodiment can be, entirely or partially, carried out manually. Similarly, all the manual processes explained in the present embodiment can be, entirely or partially, carried out automatically by a known method. The processing procedures, the control procedures, specific names, information including various types of data and parameters mentioned in the description and drawings above can be optionally changed unless otherwise specified.

Computer Program

Figure 7:
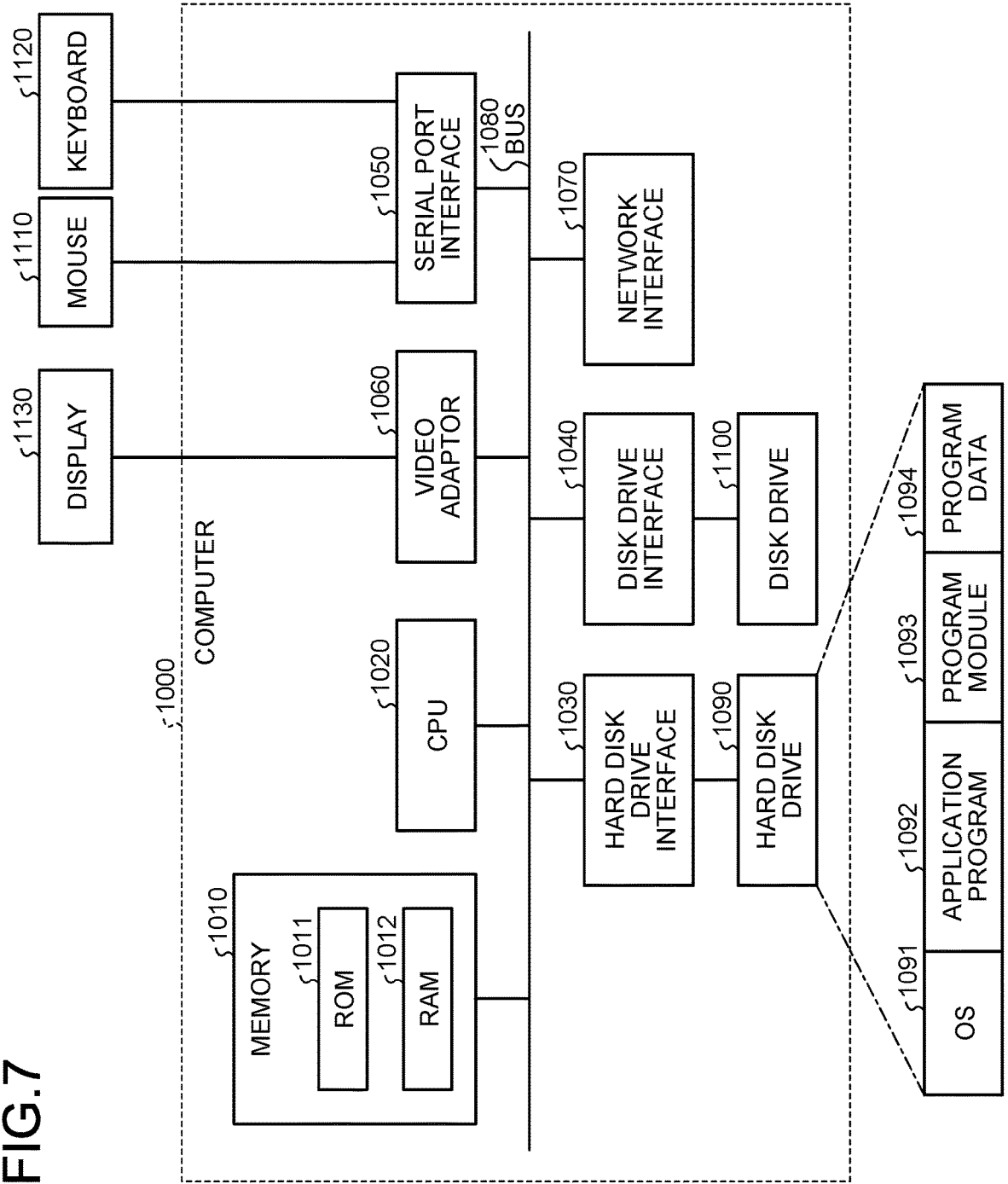
FIG. 7 is a schematic illustrating one example of a computer implementing the user device, the public device, or the security server, by executing a computer program.

FIG. 7 is a diagram illustrating an example computer implementing the user device 10, the public device 20, and the security server 30 by executing a computer program. A computer 1000 includes, for example, a memory 1010 and a CPU 1020. The computer 1000 also includes a hard disk drive interface 1030, a disc drive interface 1040, a serial port interface 1050, a video adapter 1060, and a network interface 1070. These units are connected by a bus 1080.

The memory 1010 includes a read only memory (ROM) 1011 and a RAM 1012. The ROM 1011 stores therein, for example, a boot program such as basic input/output system (BIOS). The hard disk drive interface 1030 is connected to a hard disk drive 1090. The disc drive interface 1040 is connected to a disc drive 1100. To the disc drive 1100, for example, a removable storage medium such as a magnetic disc or an optical disc is inserted. The serial port interface 1050 is connected to, for example, a mouse 1110 and a keyboard 1120. The video adapter 1060 is connected to, for example, a display 1130.

The hard disk drive 1090 stores therein, for example, an operating system (OS) 1091, an application program 1092, a program module 1093, and program data 1094. In other words, the computer program defining the processes of the user device 10, the public device 20, and the security server 30 is installed as the program module 1093 in which a computer-executable code is described. The program module 1093 is stored in, for example, the hard disk drive 1090. The hard disk drive 1090 stores therein, for example, the program module 1093 that executes the same processing as that of the functional configuration of the user device 10, the public device 20, and the security server 30. The hard disk drive 1090 may be substituted by a solid-state drive (SSD).

The setup data for use in the processing of the embodiment above is stored in, for example, the memory 1010 or the hard disk drive 1090 as the program data 1094. The CPU 1020 reads, as necessary, the program module 1093 and the program data 1094 stored in the memory 1010 or the hard disk drive 1090 onto the RAM 1012 and executes them.

The program module 1093 and the program data 1094 are not necessarily stored in the hard disk drive 1090, but may be stored in, for example, a removable storage medium and may be read by the CPU 1020 via, for example, the disc drive 1100. Alternatively, the program module 1093 and the program data 1094 may be stored in another computer connected via a network such as a local area network (LAN) or a wide area network (WAN). The program module 1093 and the program data 1094 may be read by the CPU 1020 from the other computer via the network interface 1070.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A determination system comprising:
   a memory; and
   a processor coupled to the memory and programmed to execute a process comprising:
   acquiring location data representing a location of a user device, the user device including a first sensor of a sensor type;
   identifying a public device of one or more public devices, wherein the public device is within a predetermined distance from the location of the user device, the public device includes a second sensor of the sensor type;
   requesting the user device to measure using the first sensor to acquire first chronological measurement data of the first sensor over a predetermined time duration, wherein the first chronological measurement data comprises first measurement data, and the first measurement data represent an environment signature of the location, the environment signature of the location varies over time;
   acquiring second chronological measurement data of the second sensor for the predetermined time duration from the public device, wherein the second chronological measurement data comprises second measurement data; and
   determining whether a user of the user device is legitimate based on authenticating the location of the user according to a result of matching at least the first measurement data of the first chronological measurement data of the first sensor with at least the second measurement data of the second chronological measurement data of the second sensor according to the predetermined time duration, wherein the matching further comprises matching, based on a result of matching the first measurement data and the second measurement data, another measurement data of the first chronological measurement data and another measurement data of the second chronological measurement data to improve accuracy of the location of the user for authentication.

2. The determination system according to claim 1, wherein the determining further comprises determining that the user of the user device is legitimate when the first measurement data of the first sensor and the second measurement data of the second sensor match, and determine that the user of the user device is illegitimate when the first measurement data of the first sensor and the second measurement data of the second sensor do not match.

3. The determination system according to claim 1, wherein, the second measurement data of the second sensor is measurement data measured in advance.

4. The determination system according to claim 1, further comprising
   training with the second measurement data of the second sensor, the second measurement data having been measured in advance, and predicting the second measurement data of the second sensor based on a training result.

5. The determination system according to claim 1, the environment signature includes at least one of: characterizing smell, pollution, or background noise.

6. A determination method performed by a determination system, the method comprising:
- a step of acquiring location information representing a location of a user device, the user device including a first sensor;
- a step of identifying a public device of one or more public devices, wherein the public device is within a predetermined distance from the location of the user device, the public device includes a second sensor of the sensor type;
- a step of requesting the user device to measure using the first sensor to acquire first chronological measurement data of the first sensor over a predetermined time duration, wherein the first chronological measurement data comprises first measurement data, and the first measurement data represent an environment signature of the location, the environment signature of the location varies over time;
- a step of acquiring second chronological measurement data of the second sensor for the predetermined time duration from in the public device, wherein the second chronological measurement data comprises second measurement data; and
- a step of determining whether a user of the user device is legitimate based on authenticating the location of the user according to a result of matching at let the first measurement data of the first chronological measurement data of the first sensor with at least the second measurement data of the second chronological measurement data of the second sensor according to the predetermined time duration, wherein the matching further comprises matching, based on a result of matching the first measurement data and the second measurement data, another measurement data of the first chronological measurement data and another measurement data of the second chronological measurement data to improve accuracy of the location of the user for authentication.

7. A computer-readable non-transitory recording medium having stored therein a determination program for causing a computer to execute a process comprising:
- a step of acquiring location information representing a location of a user device, the user device including a first sensor of a sensor type;
- a step of identifying a public device of for one or more public devices, wherein the public device is within a predetermined distance from the location of the user device, the public device includes a second sensor of the sensor type;
- a step of requesting the user device to measure using the first sensor to acquire first chronological measurement data of the first sensor over a predetermined time duration, wherein the first chronological measurement data comprises first measurement data, and the first measurement data represent an environment signature of the location, the environment signature of the location varies over time;
- a step of acquiring second chronological measurement data of the second sensor for the predetermined time duration from the public device, wherein the second chronological measurement data comprises second measurement data; and
- a step of determining whether a user of the user device is legitimate based on authenticating the location of the user according to a result of matching at least the first measurement data of the first chronological measurement data of the first sensor with at least the second measurement data of the second chronological measurement data of the second sensor according to the predetermined time duration, wherein the matching further comprises matching, based on a result of matching the first measurement data and the second measurement data, another measurement data of the first chronological measurement data and another measurement data of the second chronological measurement data to improve accuracy of the location of the user for authentication.

* * * * *